United States Patent [19]
Mizutani et al.

[11] Patent Number: 6,144,407
[45] Date of Patent: *Nov. 7, 2000

[54] IMAGE PICKUP APPARATUS WHICH ENABLES A LIGHT RECEIVING PERIOD TO COMMENCE WITHIN A RELATIVELY SMALL AMOUNT OF TIME AFTER A SHUTTER SIGNAL

[75] Inventors: Yoichi Mizutani, Saitama; Akihiro Kikuchi, Chiba; Junichi Sakagami, Tokyo, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,339

[22] Filed: Feb. 27, 1997

[30] Foreign Application Priority Data

Mar. 9, 1996 [JP] Japan .................................. 8-081025

[51] Int. Cl.[7] .............................. H04N 5/225; H04N 3/14
[52] U.S. Cl. ......................... 348/220; 348/312; 348/297; 348/314
[58] Field of Search .................................... 348/220, 221, 348/322, 314, 296, 294, 297, 312; 352/137

[56] References Cited

U.S. PATENT DOCUMENTS

| | | | |
|---|---|---|---|
| 4,714,963 | 12/1987 | Vogel ...................................... | 348/220 |
| 4,800,435 | 1/1989 | Ikeda et al. .............................. | 348/296 |
| 4,896,211 | 1/1990 | Hunt et al. ............................... | 348/132 |
| 4,984,002 | 1/1991 | Kokubo .................................... | 348/296 |
| 5,258,845 | 11/1993 | Kyuma et al. .......................... | 348/299 |

OTHER PUBLICATIONS

Intensified Video Camera 4 Quik 05, Stanford computer Optics,Inc., p. 29, 31–32, and 42, Jan. 1992.

Primary Examiner—Wendy Garber
Assistant Examiner—Jacqueline Wilson
Attorney, Agent, or Firm—Frommer Lawrence & Haug, LLP; William S. Frommer; Dennis M. Smid

[57] ABSTRACT

An image pickup apparatus comprises a solid-state image pickup device including a plurality of light receiving areas, charge transfer areas, charge-reading gate areas and an output portion, a synchronous signal generator for producing line and frame synchronous signals, a timing signal generator for producing selectively a first internal frame synchronous signal in synchronism with the frame synchronous signal and a second internal frame synchronous signal asynchronous with the frame synchronous signal and for forwarding a charge-reading timing signal and a charge-transfer timing signal each synchronizing with the first or second internal frame synchronous signal, a driving signal generator for producing a gate driving signal and a charge-transfer driving signal in response to the charge-reading timing signal and the charge-transfer timing signal, respectively, and for supplying charge-reading gate areas and charge transfer areas with the gate driving signal and the charge-transfer driving signal, respectively, and a control unit operative, in response to a light-receiving command signal supplied thereto, to cause the timing signal generator to forward the charge-reading timing signal and the charge-transfer timing signal each synchronizing with the second internal frame synchronous signal during a predetermined period so that a light receiving period for the solid-state image pickup device is determined in response to the second internal frame synchronous signal.

8 Claims, 7 Drawing Sheets

FIG. 4 bibliographic page

IMAGE PICKUP APPARATUS WHICH ENABLES A LIGHT RECEIVING PERIOD TO COMMENCE WITHIN A RELATIVELY SMALL AMOUNT OF TIME AFTER A SHUTTER SIGNAL

BACKGROUND OF THE INVENTION

1. Field of the Invention

The present invention relates generally to image pickup apparatus with a solid-state image pickup device, and is directed to an improvement in an image pickup apparatus which employs a solid-state image pickup device having a light receiving and charge transfer portion which comprises a plurality of light receiving areas, charge transfer areas, charge-reading gate areas for reading charge stored in the light receiving areas to the charge transfer areas, an output portion and so on, and is operative to obtain, at the output portion of the light receiving and charge transfer area, an image pickup signal output in response to charge produced and stored in the light receiving areas constituting the light receiving and charge transfer portion.

2. Description of the Prior Art

In a solid-state image pickup device used for a video camera producing video signals and the like, a light receiving and charge transfer portion comprising a plurality of light receiving areas arranged in horizontal and vertical rows for performing photoelectric conversion and charge transfer areas each composed of charge coupled devices (CCDs) or the like for transferring charge produced by light-reception to be stored in the light receiving areas, both of which are formed on a common semiconductor substrate, is provided. Such a solid-state image pickup device that has the light receiving and charge transfer portion can be employed in not only an image pickup device in which image pickup signal outputs representing moving pictures are obtained but also an image pickup device in which image pickup signal outputs representing still pictures each substantially stationary in an extremely short period are obtained.

When the solid-state image pickup device is employed in the image pickup apparatus for producing image pickup signal outputs representing still pictures, it is required to cause the light receiving areas constituting the light receiving and charge transfer portion to receive light from a subject in a very short period. Accordingly, for the solid-state image pickup device used for obtaining the image pickup signal outputs representing still pictures, a mechanical shutter is often placed in front of the light receiving and charge transfer portion to be made open and closed selectively for controlling arrival of light from the outside at the light receiving areas.

The mechanical shutter placed in front of the light receiving and charge transfer portion is normally closed to shut the light from the outside off so as not to reach the light receiving areas and made open to allow the light from the subject to arrive at the light receiving areas only during a predetermined short period. With such an operation of the mechanical shutter, each of the light receiving areas receives the light from the subject during the short period and stores therein charge produced in response to the still picture of the subject.

The charge stored in each of the light receiving areas is read through a charge-reading gate area formed in the light receiving and charge transfer portion to the charge transfer area and then transferred through the charge transfer area to an output portion of the light receiving and charge transfer portion as signal charge. In the output portion, the signal charges transferred thereto are converted into the image pickup signal output representing the still picture of the subject. The transfer of the charge in the charge transfer area is carried out with a transfer driving signal based on line and frame synchronous signals at every line period included in each frame period. Then, a video signal having line and frame periods and representing still pictures is produced on the basis of the image pickup signal output obtained from the output portion of the light receiving and charge transfer portion.

However, the above-mentioned image pickup apparatus for still pictures, in which the mechanical shutter is placed in front of the light receiving and charge transfer portion of the solid-state image pickup device, is accompanied with such problems that the mechanical shutter is complicated in structure to be considerably expensive, gradually deteriorated in mechanical accuracy with use over a long term to have lack of operation reliability, and an obstacle to miniaturization of the apparatus. Therefore, there has been also proposed an image pickup apparatus in which image pickup signal outputs representing still pictures can be obtained from a solid-state image pickup device employed therein without any mechanical shutter.

In such an image pickup apparatus for still pictures as not to have the mechanical shutter, a so-called electronic shutter is employed. According to the concept of the electronic shutter, charge which is produced by photoelectric conversion in each of light receiving areas constituting a light receiving and charge transfer portion of the solid-state image pickup device, to which light from the outside is normally introduced, is stored in each of the light receiving areas only during a short period determined by a shutter operation so as to be used for producing an image pickup signal output, and drained away to the outside of the light receiving areas and charge transfer areas without being stored during periods other than the short period determined by the shutter operation so as not to contribute to production of the image pickup signal output. The period determined by the shutter operation, during which the charge produced by photoelectric conversion in each of the light receiving areas is stored in that light receiving area, is called a light receiving period under the employment of the electronic shutter.

Figures 1A, 1B:
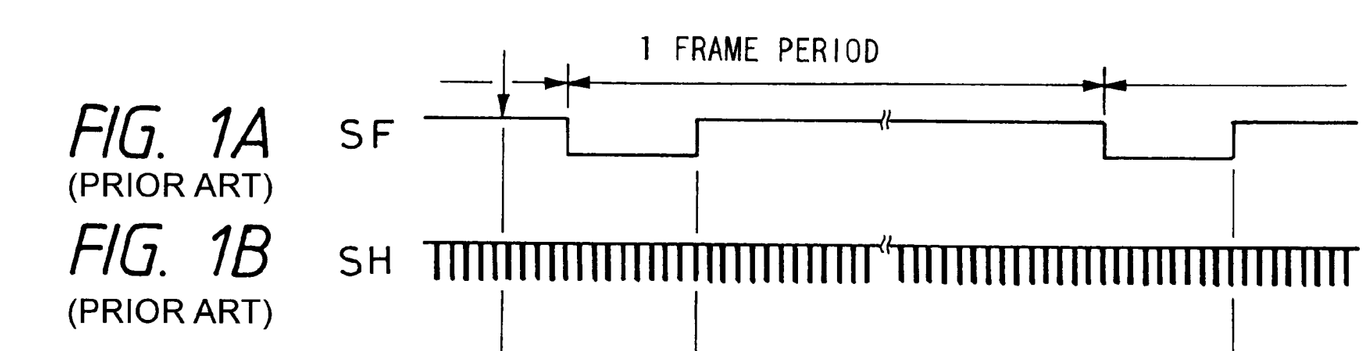
FIGS. 1A to 1D are time charts used for explaining an operation of a light receiving and charge transfer portion of a previously proposed solid-state image pickup device.
Figure 1C:
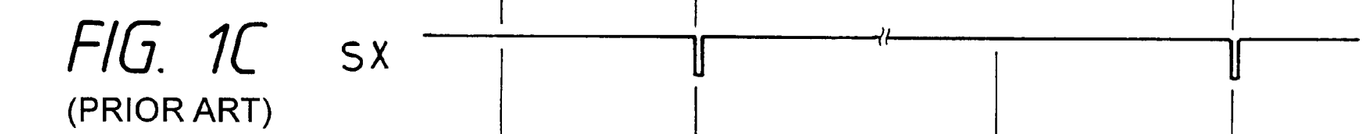

In the previously proposed image pickup apparatus for still pictures which employs the electronic shutter, the light receiving period is determined in such a manner as shown in FIGS. 1A to 1D. FIGS. 1A and 1B show respectively a frame synchronous signal SF and a line synchronous signal SH both taking part in the transfer of charge carried out by the charge transfer areas in the solid-state image pick up device. Further, as shown in FIG. 1C, a timing signal SX in synchronism with the frame synchronous signal SF is produced in the image pickup apparatus.

Figure 1D:
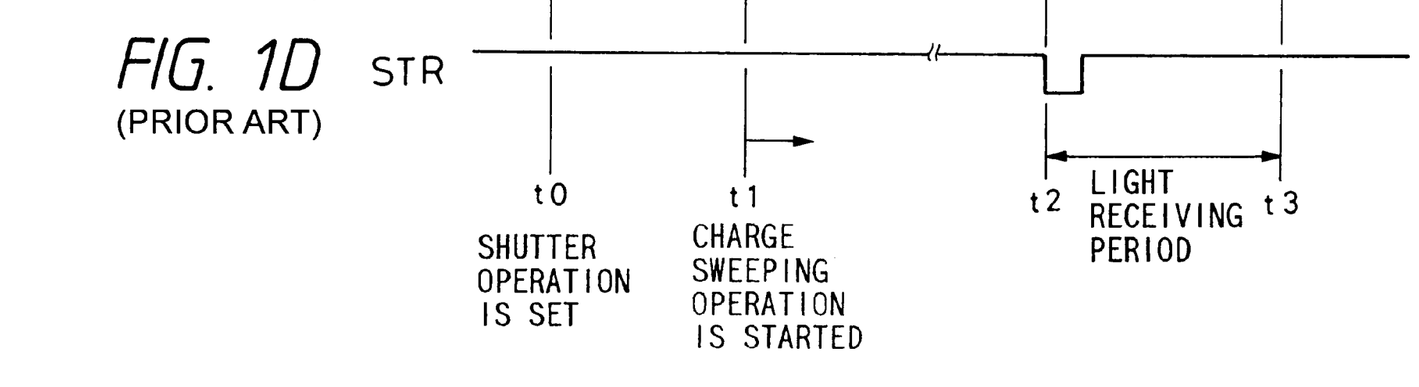

Under such a condition, when the shutter operation is set at a time point t0 shown in FIGS. 1A to 1D for causing the image pickup apparatus to begin an image pickup operation, a charge sweeping operation for sweeping away the charge in the light receiving areas and the charge transfer areas constituting the light receiving and charge transfer portion of the solid-state image pickup device to the outside of the light receiving and charge transfer portion, is started at a time point t1 corresponding to a front edge of the timing signal SX appearing first after the time point t0. This charge sweeping operation continues during a period predetermined for each solid-state image pickup device to correspond to, for example, 20 to 30 line periods. Then, as shown in FIG. 1D, a light-reception start signal STR having its front edge at a time point t2 is supplied to the solid-state image pickup device so that the light receiving period for the light receiving and charge transfer portion begins at the time point t2. The light receiving period for the light receiving and charge transfer portion terminates at a time point t3 corresponding to a front edge of the timing signal SX appearing first after the time point t2.

In this case, the light receiving period is so determined as to be the period from the time point t2 corresponding to the front edge of the light-reception start signal STR to the time point t3 corresponding to the front edge of the timing signal SX appearing first after the time point t2. The time point t3 corresponding to the front edge of the timing signal SX which determines the end of the light receiving period is fixed at a time point corresponding to a rear edge of the frame synchronous signal SF because the timing signal SX is in synchronism with the frame synchronous signal SF. Therefore, under the condition in which the light receiving period has a predetermined length of time, the time point t2 corresponding to the front edge of the light-reception start signal STR is so determined as to make the light receiving period having the predetermined length of time just before the time point t3 corresponding to the rear edge of the frame synchronous signal SF.

In the image pickup apparatus employing the solid-state image pickup device in which the light receiving period for the light receiving and charge transfer portion is determined in such a manner as mentioned above, when the shutter operation is set, the light receiving period begins in the period between the timing signals SX appearing respectively first and second after the time point at which the shutter operation is set and terminates at the time point of the timing signal SX appearing first after the time point at which the light receiving period begins. Since the timing signal SX is in synchronism with the frame synchronous signal SF, the light receiving period for the light receiving and charge transfer portion does not begin immediately after the shutter operation is set but begins when the timing signal SX appears first after the time point at which the shutter operation is set at the earliest or when a period having the length of time more than one frame period (for example, $\frac{1}{30}$ seconds) has passed after the time point at which the shutter operation is set at more belated.

This means that a light-receiving response operation in which the period for waiting for the appearance of the timing signal SX and the succeeding period in which the charge sweeping operation is carried out pass away necessarily before the light receiving period for the light receiving and charge transfer portion begins, is performed in the image pickup apparatus. Accordingly, when the image pickup apparatus is actually used, a quick light-receiving response operation can not be obtained in the light receiving and charge transfer portion of the solid-state image pickup device and it is feared that the best opportunity for picking up a desirable momentary image of a subject is easily slipped. In other words, it is feared that a use of the image pickup apparatus misses often the best shutter chance.

OBJECTS AND SUMMARY OF THE INVENTION

Accordingly, it is an object of the present invention to provide an image pickup apparatus with a solid-state image pickup device, in which at least one solid-state image pickup device having a light receiving and charge transfer portion which comprises a plurality of light receiving areas, charge transfer areas, charge-reading gate areas for reading charge stored in the light receiving areas to the charge transfer areas, and an output portion is employed and any mechanical shutter is not placed in front of the light receiving and charge transfer portion of the solid-state image-pickup device, which avoids the aforementioned problems and difficulties encountered with the prior art.

Another object of the present invention is to provide an image pickup apparatus with a solid-state image pickup device, in which at least one solid-state image pickup device having a light receiving and charge transfer portion which comprises a plurality of light receiving areas, charge transfer areas, charge-reading gate areas for reading charge stored in the light receiving areas to the charge transfer areas, and an output portion is employed and any mechanical shutter is not placed in front of the light receiving and charge transfer portion of the solid-state image pickup device, and with which a disadvantage that the best opportunity for picking up a desirable momentary image of a subject is slipped due to a dull response in relation to a shutter operation can be effectively suppressed.

A further object of the present invention is to provide an image pickup apparatus with a solid-state image pickup device, in which at least one solid-state image pickup device having a light receiving and charge transfer portion which comprises a plurality of light receiving areas, charge transfer areas, charge-reading gate areas for reading charge stored in the light receiving areas to the charge transfer areas, and an output portion is employed and any mechanical shutter is not placed in front of the light receiving and charge transfer portion of the solid-state image pickup device, and which can perform a quick light-receiving response operation in the light receiving and charge transfer portion of the solid-state image pickup device for producing an image pickup signal output representing still pictures when a shutter operation is set.

A still further object of the present invention is to provide an image pickup apparatus with a solid-state image pickup device, in which at least one solid-state image pickup device having a light receiving and charge transfer portion which comprises a plurality of light receiving areas, charge transfer areas, charge-reading gate areas for reading charge stored in the light receiving areas to the charge transfer areas, and an output portion is employed and any mechanical shutter is not placed in front of the light receiving and charge transfer portion of the solid-state image pickup device, and which can perform an improved light-receiving response operation by which a light receiving period for the light receiving and charge transfer portion of the solid-state image pickup device is started to continue over a predetermined length of time immediately after a shutter operation is set.

According to the present invention, there is provided an image pickup apparatus with a solid-state image pickup device, which comprises a solid-state image pickup device having a light receiving and charge transfer portion which comprises a plurality of light receiving areas for storing therein with charge produced by receiving light, charge transfer areas for transferring charge, charge-reading gate areas for reading the charge stored in the light receiving areas to the charge transfer areas and an output portion for converting the charge transferred through the charge transfer areas into an image pickup signal output; a synchronous signal generator for producing line and frame synchronous signals; a timing signal generator for producing selectively a first internal frame synchronous signal having the same phase as the frame synchronous signal or a fixed phase difference from the frame synchronous signal and a second internal frame synchronous signal asynchronous with the frame synchronous signal and for forwarding a charge-reading timing signal and a charge-transfer timing signal each synchronizing with the first or second internal frame synchronous signal; a driving signal generator for producing a gate driving signal and a charge-transfer driving signal in response to the charge-reading timing signal and the charge-transfer timing signal, respectively, and for supplying the charge-reading gate areas and the charge transfer areas with the gate driving signal and the charge-tranfer driving signal, respectively; and a control unit operative, in response to a light-receiving command signal supplied thereto, to cause the timing signal generator to produce the second internal frame synchronous signal and forward the charge-reading timing signal and the charge-transfer timing signal each synchronizing with the second internal frame synchronous signal during a predetermined period so that a light receiving period for the light receiving and charge transfer portion of the solid-state image pickup device is determined in response to the second internal frame synchronous signal.

The image pickup apparatus with a solid-state image pickup device thus constituted in accordance with the present invention is operative to perform an image pickup operation for obtain image pickup signal outputs representing still pictures of a subject. When the image pickup operation by the image pickup apparatus according to the present invention is carried out, the light-receiving command signal is supplied to the control unit in response to a shutter operation set for causing the image pickup apparatus to begin the image pickup operation. The control unit controls the timing signal generator, in response to the light-receiving command signal supplied thereto, so that the timing signal generator generates the second internal frame synchronous signal asynchronous with the frame synchronous signal and supplies the driving signal generator with the charge-reading timing signal and the charge-tranfer timing signal each synchronizing with the second internal frame synchronous signal during the predetermined period which is determined under the control by the control unit.

The driving signal generator produces the gate driving signal for driving the charge-reading gate areas in the solid-state image pickup device and the charge-transfer driving signal for driving the charge transfer areas in the solid-state image pickup device in response to the charge-reading timing signal and the charge-transfer timing signal, respectively, and supplies the charge-reading gate areas and the charge transfer areas with the gate driving signal and the charge-tranfer driving signal, respectively, in such a manner that the charge produced by receiving light is stored in the light receiving areas in the solid-state image pickup device during the predetermined period. Consequently, the light receiving period for the light receiving and charge transfer portion of the solid-state image pickup device is determined in response to the second internal frame synchronous signal.

After that, the charge stored in the light receiving areas contained in the light receiving and charge transfer portion during the light receiving period determined in response to the second internal frame synchronous signal as described above, is read through the charge-reading gate areas to the charge transfer areas in response to the gate driving signal from the driving signal generator and then transferred through the charge transfer areas to the output portion in response to the charge-transfer driving signal from the driving signal generator. In the output portion, the charge transferred through the charge transfer areas is converted into the image pickup signal output.

Under such an operation, since the light receiving period determined in response to the second internal frame synchronous signal is provided to be in asynchronism with the frame synchronous signal, it is possible to cause the light receiving period to begin to continue over the predetermined period immediately after the shutter operation is set. Therefore, with the image pickup apparatus according to the present invention, a quick light-receiving response operation in the light receiving and charge transfer portion of the solid-state image pickup device for producing the image pickup signal output representing still pictures can be carried out when the shutter operation is set. Consequently, when the image pickup apparatus according to the present invention is actually used, a disadvantage that the best opportunity for picking up a desirable momentary image of a subject is slipped due to a dull response in relation to the shutter operation can be effectively suppressed.

The above, and other objects, features and advantages of the present invention will become apparent from the following detailed description taken in conjunction with the accompanying drawings.

DESCRIPTION OF THE PREFERRED EMBODIMENTS

Figure 2:
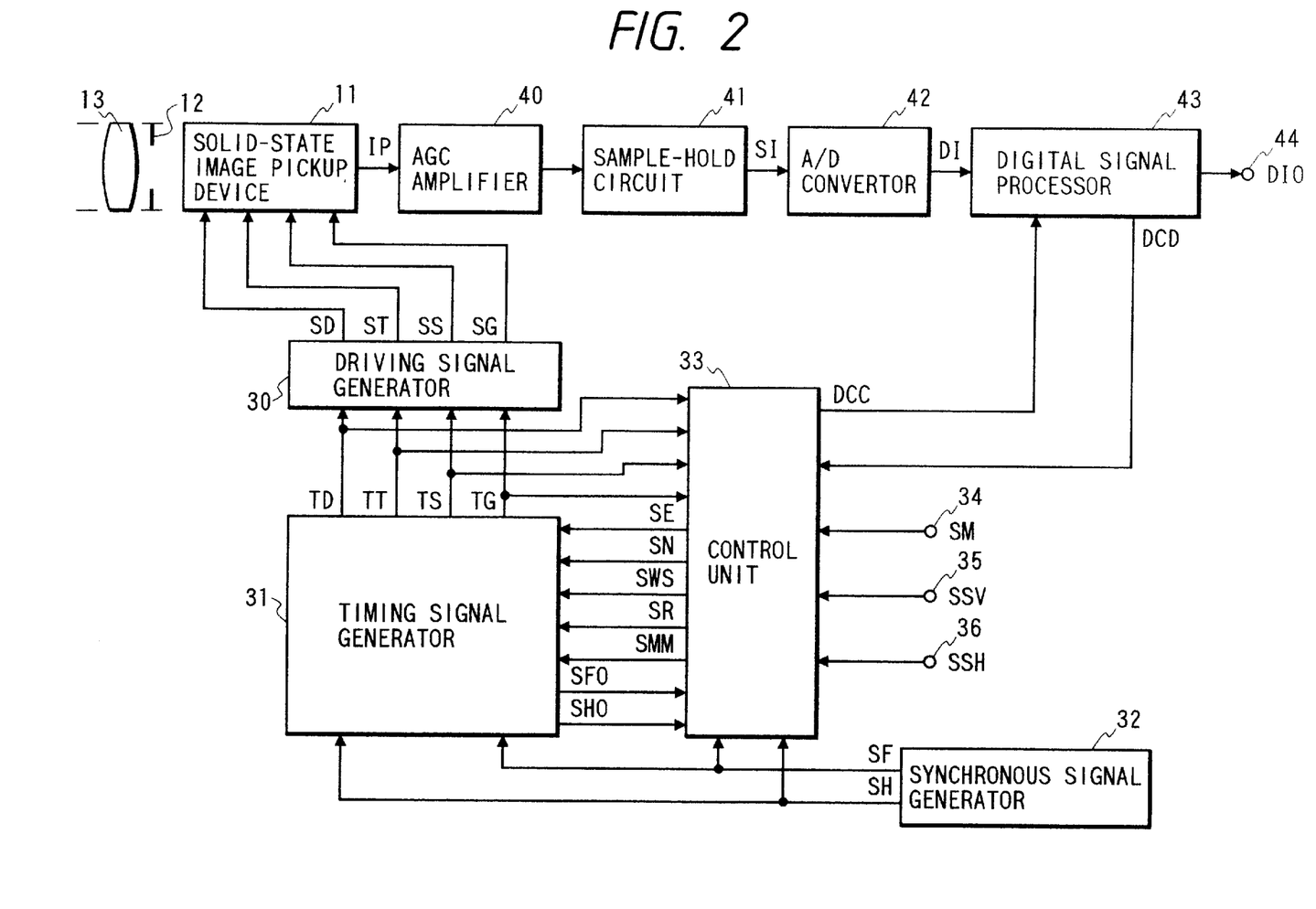
FIG. 2 is a schematic block diagram showing one embodiment of image pickup apparatus with a solid-state image pickup device according to the present invention.

FIG. 2 shows an embodiment of image pickup apparatus with a solid-state image pickup device according to the present invention.

Referring to FIG. 2, a solid-state image pickup device 11 having a light receiving and charge transfer portion which comprises a plurality of light receiving areas arranged in horizontal and vertical rows and charge transfer areas composed of CCDs for transferring charge produced in the light receiving areas is provided. An optical system including an iris 12 and a lens 13 is placed in front of the solid-state image pickup device 11. Light from the outside is incident through the optical system to the light receiving and charge transfer portion of the solid-state image pickup device 11 to project an image of a subject on the light receiving and charge transfer portion.

Figure 3:
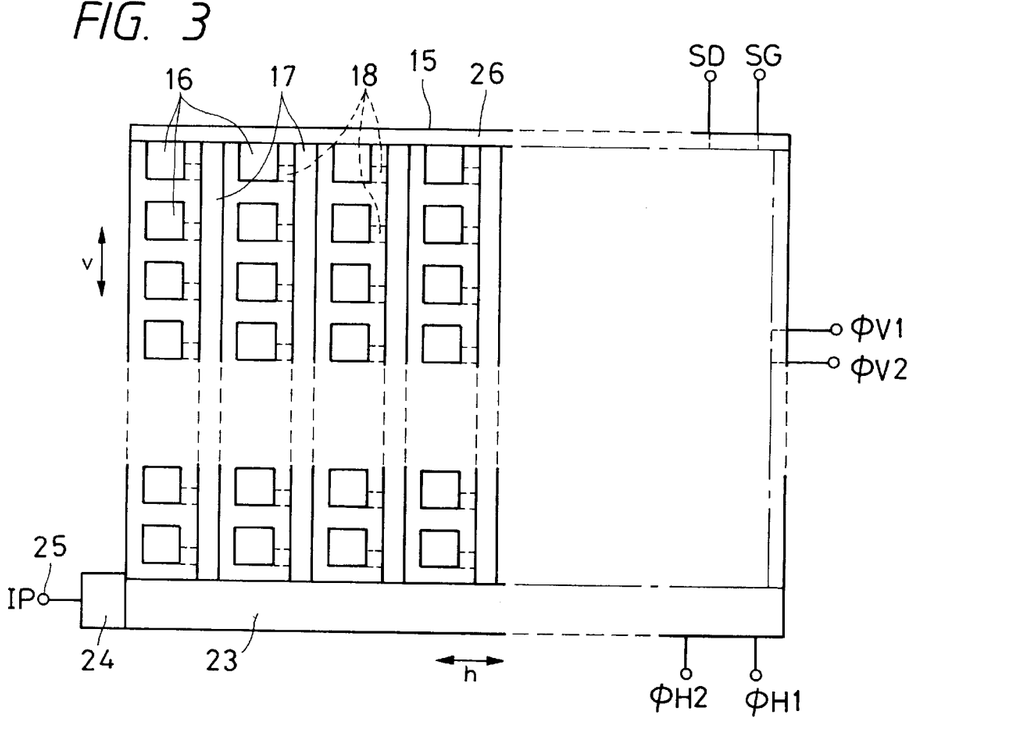
FIG. 3 is a schematic plane view used for explaining the light receiving and charge transfer portion of the solid-state image pickup device employed in the embodiment shown in FIG. 2.

The solid-state image pickup device 11 has the light receiving and charge transfer portion as shown in FIG. 3, for example. In the light receiving and charge transfer portion shown in FIG. 3, a plurality of light receiving areas 16 each forming a picture element are arranged in a plurality of parallel rows each extending in the horizontal direction(the direction indicated by arrows h) and a pluralit y of parallel vertical rows each extending in the vertical direction (the direction indicated by arrows v) on a semiconductor substrate 15. Vertical charge transfer areas 17 each composed of a group of CCDs are also arranged on the semiconductor substrate 15 to extend along the vertical rows of the light receiving areas 16. Each of the vertical charge transfer areas 17 is driven by two-phase vertical charge-transfer driving signals øV1 and øV2 for performing a charge transfer operation. A charge-reading gate area 18 is provided between each of the light receiving areas 16 forming each vertical row and the vertical charge transfer area 17 corresponding to that vertical row.

Figure 4:
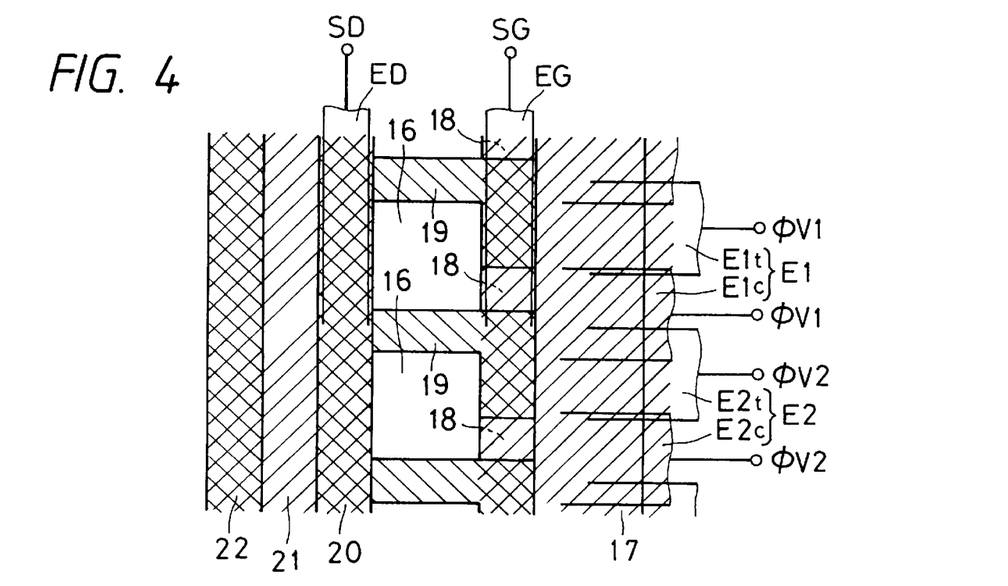
FIG. 4 is a schematic plane view on an enlarged scale of a part of the light receiving and charge transfer portion shown in FIG. 3.

Further, as shown in FIG. 4, channel stop areas 19 and an overflow control area 20 extending vertically are provided around each of the light receiving areas 16. A drain area 21 extending vertically is provided to be contiguous with the overflow control area 20 and the drain area 21 and the next vertical charge transfer area 17 are separated from each other by a channel stop area 22 extending vertically.

An insulating layer is put over the light receiving and charge transfer portion on the semiconductor substrate 15. On a portion of the insulating layer covering each of the vertical charge transfer areas 17, vertical transfer electrodes E1 and E2 each extending in the horizontal direction are provided alternately in the vertical direction. Each vertical transfer electrodes E1 is composed of a charge storage electrode E1c and a charge transfer electrode E1t and each vertical transfer electrodes E2 is composed of a charge storage electrode E2c and a charge transfer electrode E2t. The vertical charge-transfer driving signals øV1 and øV2 are supplied to the vertical transfer electrodes E1 and E2, respectively.

A reading gate electrode EG extending in the vertical direction is provided on a portion of the insulating layer covering each of the charge-reading gate areas 18 and an overflow gate electrode ED extending in the vertical direction is provided on a portion of the insulating layer covering the overflow control area 20. A reading gate driving signal SG and an overflow gate control signal SD are supplied to the reading gate electrode EG and the overflow gate electrode ED, respectively. The insulating layer put over the light receiving and charge transfer portion is covered by a shading layer with the exception of a window formed on each of the light receiving areas 16.

One end of each of the vertical charge transfer areas 17 is connected with a horizontal charge transfer area 23 composed of a group of CCDs to extend in the horizontal direction on a part of a peripheral end portion of the semiconductor substrate 15. The horizontal charge transfer area 23 is driven by two-phase horizontal charge-transfer driving signals øH1 and øH2 for performing a charge transfer operation. An output portion 24 is provided at one end of the horizontal charge transfer area 23, and an output terminal 25 is derived from the output portion 24.

Another end of each of the vertical charge transfer areas 17 is connected with a charge absorbing area 26 extending in the horizontal direction on another part of the peripheral end portion of the semiconductor substrate 15.

When an operation for obtaining image pickup signal outputs is carried out in the solid-state image pickup device 11 having the light receiving and charge transfer portion as shown in FIGS. 3 and 4, a light receiving period for the light receiving and charge transfer portion, which has a predetermined length of time, is determined, and each of the light receiving areas 16 is operative to receive the light incident through the optical system including the lens 13 and the iris 12 to the light receiving and charge transfer portion from the subject, to perform photoelectric conversion for producing charge corresponding to the light received, and to store therein with the charge produced by the photoelectric conversion during the light receiving period. Then, the charge stored in the light receiving areas 16 is read to the vertical charge transfer areas 17 through the charge-reading gate areas 18 driven by the reading gate driving signal SG which is supplied to the reading gate electrodes EG from a driving signal generator 30.

After that, the charge read to the vertical charge transfer areas 17 is transferred toward the horizontal charge transfer area 23 in accordance with the charge transfer operation of the vertical charge transfer areas 17 driven by a charge-transfer driving signal ST supplied from the driving signal generator 30, which includes the two-phase vertical charge-transfer driving signals øV1 and øV2 supplied to the vertical transfer electrodes E1 and E2, respectively. In this charge transfer operation of the vertical charge transfer areas 17, the charge read to the vertical charge transfer areas 17 is divided into a plurality of segments of charge each stored in each horizontal row of the light receiving areas 16 and transferred at every segment of charge successively toward the horizontal charge transfer area 23 as a signal charge. In the horizontal charge transfer area 23, each of the segments of charge transferred through the vertical charge transfer areas 17 to the horizontal charge transfer area 23 as the signal charge is transferred successively toward the output portion 24 in accordance with the charge transfer operation of the horizontal charge transfer area 23 driven by the charge-transfer driving signal ST supplied from the driving signal generator 30, which includes the two-phase horizontal charge-transfer driving signals øH1 and øH2. The, in the output portion 24, the signal charge transferred through the horizontal charge transfer area 23 is converted into a signal to be derived to the output terminal 25, so that an image pickup signal output IP based on the charge stored in the light receiving areas 16 and corresponding to the subject is obtained at the output terminal 25.

In the operation mentioned above, the charge-transfer driving signal ST including the two-phase vertical charge-transfer driving signals øV1 and øV2 and the two-phase horizontal charge-transfer driving signals øH1 and øH2 is so produced that the transfer of the charge which is stored in the light receiving areas 16 forming the whole horizontal rows during the light receiving period to the horizontal charge transfer area 23 by the vertical charge transfer area 17 is completed within each frame period, and the transfer of the signal charge which corresponds to each of the segments of charge transferred through the vertical charge transfer areas 17 to the output portion 24 by the horizontal charge transfer area 23 is completed within each line period. Accordingly, the image pickup signal output IP obtained at the output terminal 25 is formed with a train of frame period signal components each including a predetermined number of line period signal components.

The driving signal generator 30 to which a charge-reading timing signal TG, a charge-transfer timing signal TT, a charge-sweeping timing signal TS and a charge-drain timing signal TD are supplied from a timing signal generator 31 is operative to forward the reading gate driving signal SG produced in response to the charge-reading timing signal TG, to establish selectively an operating condition in which the charge-transfer driving signal ST which includes the two-phase vertical charge-transfer driving signals øV1 and ØV2 and the two-phase horizontal charge-transfer driving signals ØH1 and ØH2 each produced in response to the charge-transfer timing signal TT is forwarded and an operating condition in which a charge-sweeping driving signal SS which includes the two-phase vertical charge-transfer driving signals ØV1 and ØV2 and the two-phase horizontal charge-transfer driving signals ØH1 and ØH2 each produced in response to the charge-sweeping timing signal TS is forwarded, and to forward the overflow gate control signal SD produced in response to the charge-drain timing signal TD.

The timing signal generator 31 is supplied with a frame synchronous signal SF and a line synchronous signal SH from a synchronous signal generator 32 and further with a light receiving period signal SE, an asynchronous normal light receiving mode setting signal SN, an asynchronous shutter waiting mode setting signal SWS, a synchronizing mode reviving signal SR and a multiple exposure mode setting signal SMM from a control unit 33. Then, the timing signal generator 31 is operative to establish selectively a first operating condition in which an internal frame synchronous signal SFO in synchronism with the frame synchronous signal SF, namely an internal frame synchronous signal SFO having the same phase as the frame synchronous signal SF or a fixed phase difference from the frame synchronous signal SF, and an internal line synchronous signal SHO in synchronism with the line synchronous signal SH, namely an internal line synchronous signal SHO having the same phase as the line synchronous signal SH or a fixed phase difference from the line synchronous signal SH and a second operating condition in which an internal frame synchronous signal SFO asynchronous with the frame synchronous signal SF and an internal line synchronous signal SHO asynchronous with the line synchronous signal SH, in accordance with the situation of a group of signals including the light receiving period signal SE, the asynchronous normal light receiving mode setting signal SN, the asynchronous shutter waiting mode setting signal SWS, the synchronizing mode reviving signal SR and the multiple exposure mode setting signal SMM from the control unit 33.

Further, the driving signal generator 30 is operative to establish selectively an operating condition in which the charge-reading timing signal TG, the charge-transfer timing signal TT, the charge-sweeping timing signal TS and the charge-drain timing signal TD each obtained based on the internal frame synchronous signal SFO and the internal line synchronous signal SHO which are in synchronism with the frame synchronous signal SF and the line synchronous signal SH, respectively, are supplied from the timing signal generator 31 and the reading gate driving signal SG produced in response to the charge-reading timing signal TG is forwarded, and an operating condition in which the charge-reading timing signal TG, the charge-transfer timing signal TT, the charge-sweeping timing signal TS and the charge-drain timing signal TD each obtained based on the internal frame synchronous signal SFO and the internal line synchronous signal SHO which are asynchronous with the frame synchronous signal SF and the line synchronous signal SH, respectively, are supplied from the timing signal generator 31 and the reading gate driving signal SG produced in response to the charge-reading timing signal TG is forwarded.

The frame synchronous signal SF and the line synchronous signal SH obtained from the synchronous signal generator 32 and the internal frame synchronous signal SFO and the internal line synchronous signal SHO obtained from the timing signal generator 31 are supplied also to the control unit 33. Similarly, the charge-reading timing signal TG, the charge-transfer timing signal TT, the charge-sweeping timing signal TS and the charge-drain timing signal TD obtained from the timing signal generator 31 are supplied also to the control unit 33. Further, an operation mode designating signal SM, a shutter speed designating signal SSV and a shutter signal SSH are supplied through a terminal 34, a terminal 35 and a terminal 36, respectively, to the control unit 33. The shutter signal SSH is produced in response to the shutter operation for causing the image pickup apparatus to begin the image pickup operation and acts as a light-receiving command signal.

The image pickup signal output IP which is obtained at the output terminal 25 provided on the light receiving and charge transfer portion shown in FIG. 3 is amplified by an automatic gain control amplifier (AGC amplifier) 40 and supplied to a sample-hold circuit 41, as shown in FIG. 2. In the sample-hold circuit 41, the level sampling of the image pickup signal output IP is conducted at short regular intervals and the sampled levels obtained thereby are held to produce a sample-hold output signal SI. The sample-hold output signal SI is supplied to an analog to digital convertor (A/D convertor) 42. In the A/D convertor 42, in substance, the image pickup signal output IP is digitalized on the strength of the sample-hold output signal SI to produce a digital image pickup signal DI corresponding to the image pickup signal output IP. The digital image pickup signal DI obtained from the A/D convertor 42 is supplied to a digital signal processor 43.

Control data DCC are supplied to the digital signal processor 43 from the control unit 33 and control data DCD are supplied to the control unit 33 from the digital signal processor 43. In the digital signal processor 43, the digital image pickup signal DI is subjected to various digital processings in response to the control data DCC on which the control data DCD are reflected. As a result, a digital image pickup signal output DIO is derived from the digital signal processor 43 to an output terminal 44.

Under such a situation, when an operation for obtaining image pickup signal outputs representing still pictures (an image pickup operation for still pictures) is carried out in the embodiment shown in FIG. 2, the operation mode designating signal SM for designating an operation mode to be set up and the shutter speed designating signal SSV for designating a shutter speed to be selected are supplied to the control unit 33 through the terminals 34 and 35, respectively. The operation mode designating signal SM designates, for example, an asynchronous normal light receiving mode, an asynchronous shutter waiting mode, or a multiple exposure mode.

Figure 5A:
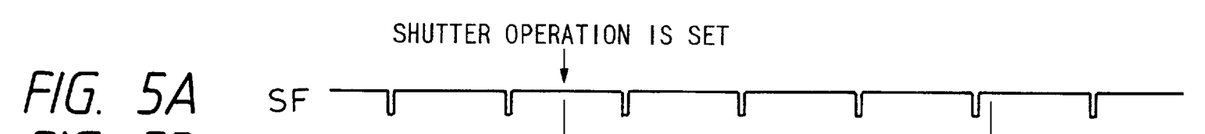
FIGS. 5A to 5J are time charts used for explaining the operation of the embodiment shown in FIG. 2.

When the operation mode designating signal SM designates the asynchronous normal light receiving mode, the control unit 33 supplies the timing signal generator 31 with the asynchronous normal light receiving mode setting signal SN. The timing signal generator 31 produces, in response to the asynchronous normal light receiving mode setting signal SN, a timing signal SXO shown in FIG. 5E based on the internal frame synchronous signal SFO shown in FIG. 5D which has the fixed phase difference from the frame synchronous signal SF generated by the synchronous signal generator 32 as shown in FIG. 5A, as shown in a period before a time point ta in FIGS. 5A to 5J.

Figures 5B, 5C, 5D:
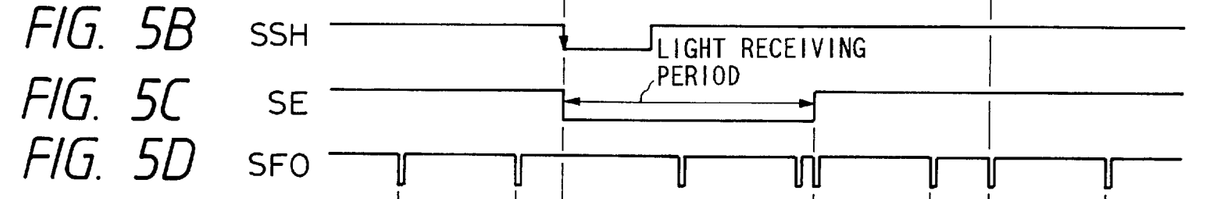
Figures 5E, 5F, 5G, 5H, 5I:
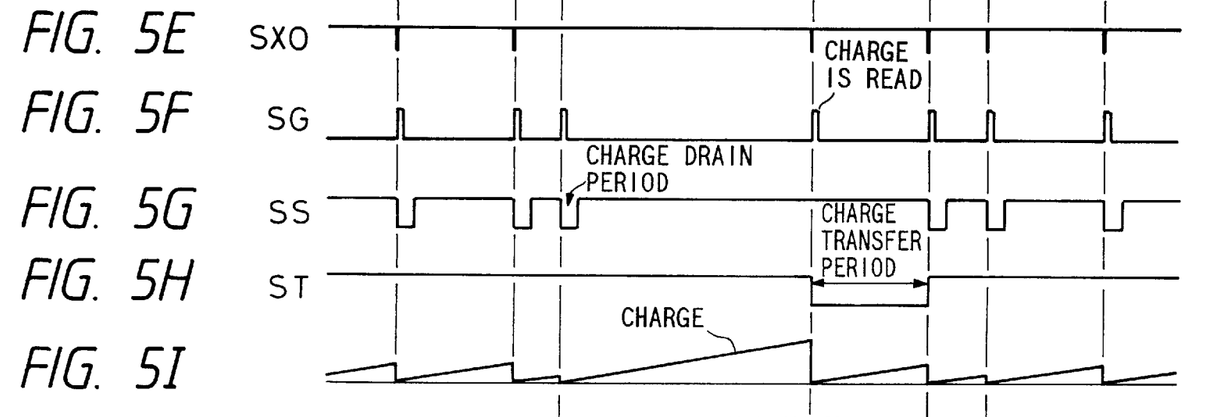
Figure 5J:
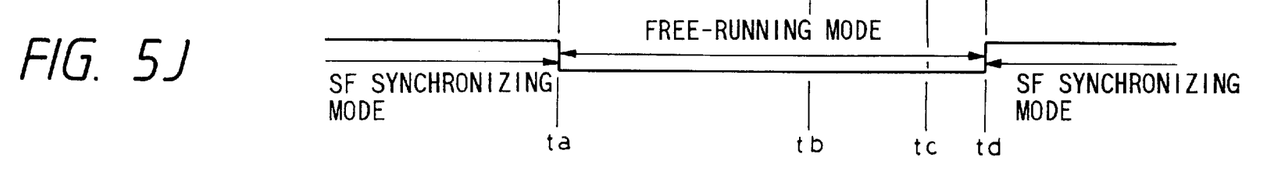

At this time, the charge-reading timing signal TG, the charge-tranfer timing signal TT, the charge-sweeping timing signal TS and the charge-drain timing signal TD each produced in response to the internal frame synchronous signal SFO are forwarded from the timing signal generator 31 and therefore the reading gate driving signal SG shown in FIG. 5F and the charge-sweeping driving signal SS shown in FIG. 5G each in synchronism with the internal frame synchronous signal SFO are forwarded from the driving signal generator 30, as shown in the period before the time point ta in FIGS. 5A to 5J. During the period before the time point ta in FIGS. 5A to 5J, a SF synchronizing mode which is in synchronism with the frame synchronous signal SF is maintained as indicated in FIG. 5J.

Under the SF synchronizing mode, when the shutter operation is set at the time point ta, the shutter signal SSH is supplied through the terminal 36 to the control unit 33 as the light-receiving command signal. The control unit 33 supplies, in response to the front edge of the shutter signal SSH, the timing signal generator 31 with the light receiving period signal SE shown in FIG. 5C. The timing signal generator 31 is operative to reset the production of the internal frame synchronous signal SFO with the front edge of the light receiving period signal SE so that the internal frame synchronous signal SFO is put in asynchronism with the frame synchronous signal SF and the timing signal SXO is stopped to be produced, as shown in FIGS. 5C, 5D and 5E, and to forward the charge-reading timing signal TG and the charge-drain timing signal TD each produced in response to the front edge of the light receiving period signal SE.

The reading gate driving signal SG and the charge-sweeping driving signal SS each produced in response to the front edge of the light receiving period signal SE, as shown in FIGS. 5F and 5G, are supplied from the driving signal generator 30 to the light receiving and charge transfer portion of the solid-state image pickup device 11. Thereby, in the light receiving and charge transfer portion of the solid-state image pickup device 11, each of the charge-reading gate areas 18 is made open in response to the reading gate driving signal SG so that the charge stored in the light receiving areas 16 is read through the charge-reading gate areas 18 to the vertical charge transfer areas 17 and the charge read to the vertical charge transfer areas 17 is transferred, in response to the charge-sweeping driving signal SS, through the vertical charge transfer areas 17 toward the charge absorbing area 26 which is provided on the semiconductor substrate 15 to be opposite to the horizontal charge transfer area 23, so that a charge sweeping operation for sweeping the charge away from the vertical charge transfer areas 17 is performed. The charge swept away from the vertical charge transfer areas 17 by the charge sweeping operation is absorbed by the charge absorbing area 26. A charge sweeping period in which the charge sweeping operation is carried out corresponds to, for example, twenty-seven line periods. Then, the light receiving period for the light receiving and charge transfer portion of the solid-state image pickup device 11, which includes the charge sweeping period, begins at the time point ta corresponding to the front edge of the light receiving period signal SE and the condition is shifted to a free-running mode from the SF synchronizing mode, as indicated in FIG. 5J. In the light receiving period, the internal frame synchronous signal SFO which is reset at the time point ta corresponding to the front edge of the light receiving period signal SE to be asynchronous with the frame synchronous signal SF is obtained but the timing signal SXO is not obtained. Therefore, the reading gate driving signal SG is not obtained after the time point ta and accordingly each of the charge-reading gate areas 18 is kept closed except in a very short period at the beginning of the charge sweeping period, so that the charge stored in the light receiving areas 16 increases gradually, as shown in FIG. 5I.

Figure 6:
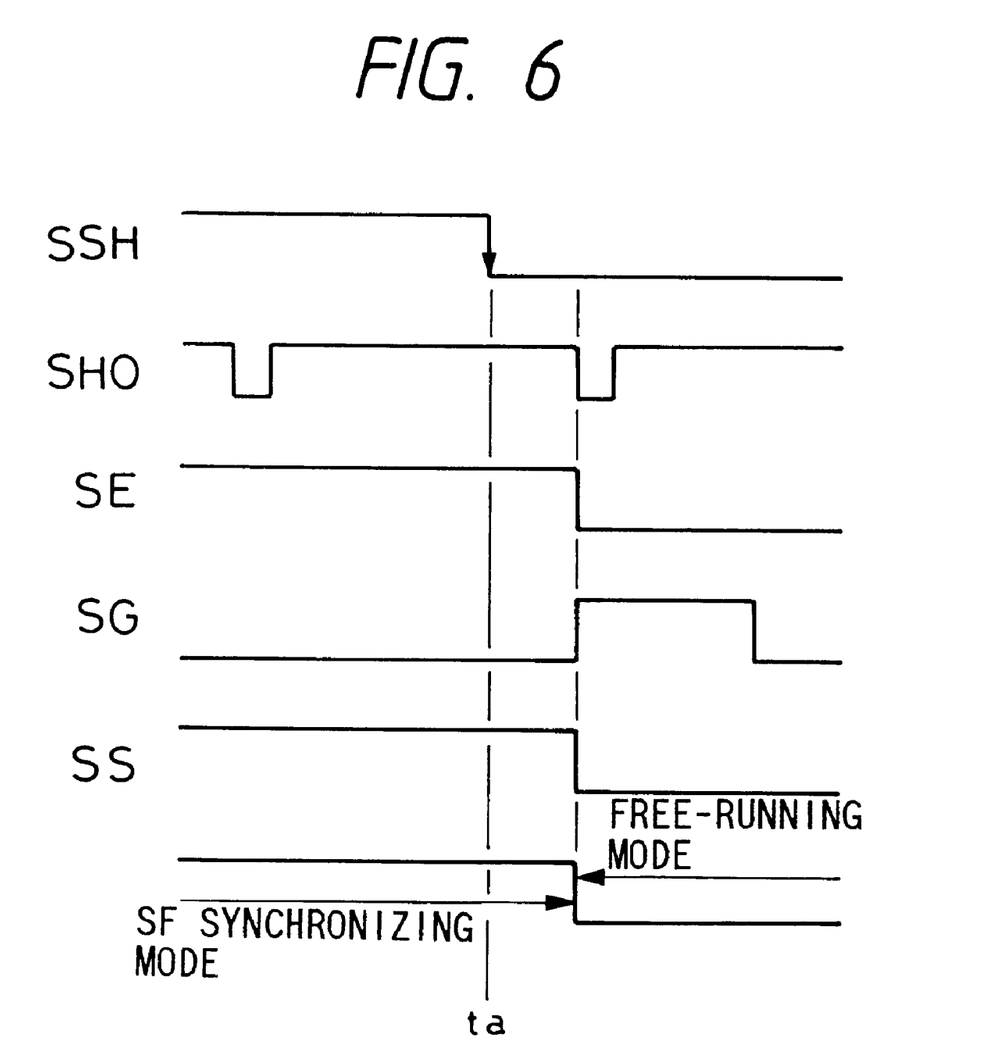
FIG. 6 is a group of time charts used for explaining the operation of the embodiment shown in FIG. 2.

FIG. 6 shows detailed timing relations between the shutter signal SSH and each of the internal line synchronous signal SHO, the light receiving period signal SE, the reading gate driving signal SG and the charge-sweeping driving signal SS. In the timing relations shown in FIG. 6, when the front edge of the shutter signal SSH appears at the time point ta, the front edge of the light receiving period signal SE is obtained at the time point corresponding to the front edge of the internal line synchronous signal SHO which appears first after the time point ta. Then, each of the front edge of the reading gate driving signal SG and the front edge of the charge-sweeping driving signal SS is obtained at the time point corresponding to the front edge of the light receiving period signal SE and the condition is shifted to a free-running mode from the SF synchronizing mode. This means that the front edge of the light receiving period signal SE is late just a little (by one line period at the maximum) compared with the front edge of the shutter signal SSH.

After that, when the rear edge of the light receiving period signal SE supplied to the timing signal generator 31 from the control unit 33 appears at a time point tb, as shown in FIG. 5C, the internal frame synchronous signal SFO is obtained in response to the rear edge of the light receiving period signal SE and the timing signal SXO is obtained in response to the front edge of the internal frame synchronous signal SFO, as shown in FIGS., 5D and 5E, in the timing signal generator 31. The time point tb corresponding to the rear edge of the light receiving period signal SE is determined by the control unit 33 in response to the shutter speed designated by the shutter speed designating signal SSV. The timing signal generator 31 is operative to forward the charge-reading timing signal TG and the charge-transfer timing signal TT in response to the timing signal SXO and therefore the reading gate driving signal SG and the charge-transfer driving signal ST each having the front edge at the time point tb corresponding to the rear edge of the light receiving period signal SE, as shown in FIG. 5F and 5H, are supplied to the light receiving and charge transfer portion of the solid-state image pickup device 11 from the driving signal generator 30 and the light receiving period terminates.

Thereby, in the light receiving and charge transfer portion of the solid-state image pickup device 11, each of the charge-reading gate areas 18 is made open in response to the reading gate driving signal SG so that the charge stored in the light receiving areas 16 is read through the charge-reading gate areas 18 to the vertical charge transfer areas 17, as shown in FIG. 5I, and the charge read to the vertical charge transfer areas 17 is transferred, in response to the charge-transfer driving signal ST, through the vertical charge transfer areas 17 toward the horizontal charge transfer area 23 provided on the semiconductor substrate 15 as the signal charge. The signal charge transferred to the horizontal charge transfer area 23 is further transferred, in response to the charge-transfer driving signal ST, through the horizontal charge transfer area 23 toward the output portion 24. The signal charge transferred to the output portion 24 is converted into the image pickup signal output IP in the output portion 24 and the image pickup signal output IP is derived to the output terminal 25.

The charge transfer period in which the charge transfer operation of the vertical charge transfer areas 17 and the charge transfer operation of the horizontal charge transfer area 23 are carried out terminates with the rear edge of the charge-transfer driving signal ST appearing at a time point tc at which the internal frame synchronous signal SFO is obtained and the timing signal SXO is further obtained in response to the front edge of the internal frame synchronous signal SFO in the timing signal generator 31, as shown in FIGS. 5D and 5E. Then, the timing signal generator 31 is operative to forward the charge-reading timing signal TG and the charge-sweeping timing signal TS in response to the timing signal SXO and the reading gate driving signal SG and the charge-sweeping driving signal SS each having the front edge at the time point corresponding to the rear edge of the charge-transfer driving signal ST, as shown in FIGS. 5F and 5G, are supplied from the driving signal generator 30 to the light receiving and charge transfer portion of the solid-state image pickup device 11. Thereby, in the light receiving and charge transfer portion of the solid-state image pickup device 11, the charge sweeping operation is carried out.

After that, at a time point td, the internal frame synchronous signal SFO produced in the timing signal generator 31 resumes to have the fixed phase difference from the frame synchronous signal SF, as shown in FIG. 5D, and the condition is returned to the SF synchronizing mode from the free-running mode, as indicated in FIG. 5J.

In the case where the image pickup operation for still pictures is carried out under the asynchronous normal light receiving mode as described above, when the shutter operation is set, the light receiving period for the light receiving and charge transfer portion of the solid-state image pickup device 11 begins at a time point which is late by one line period at the maximum compared with the time point at which the shutter operation is set and then a light receiving state in which charge is effectively stored in the light receiving areas 16 constituting the light receiving and charge transfer portion of the solid-state image pickup device 11 is obtained immediately after the charge sweeping period which corresponds to, for example, twenty-seven line periods and starts at the beginning of the light receiving period. Accordingly, a light-receiving response operation which is performed in response to the setting of the shutter operation in the light receiving and charge transfer portion of the solid-state image pickup device 11 is steeply improved in quickness.

Figures 7A, 7B:
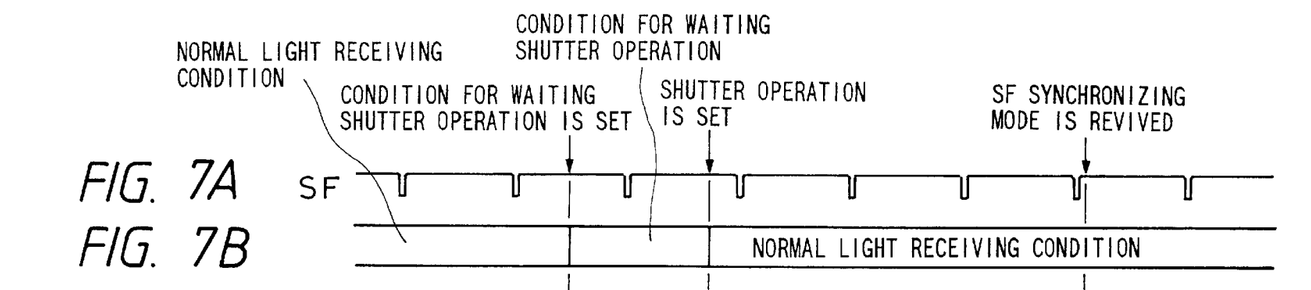
FIGS. 7A to 7J are time charts used for explaining the operation of the embodiment shown in FIG. 2.

When the operation mode designating signal SM designates the asynchronous shutter waiting mode, the control unit 33 supplies the timing signal generator 31 with the asynchronous shutter waiting mode setting signal SWS. Under a condition in which the internal frame synchronous signal SFO having a fixed phase difference from the frame synchronous signal SF shown in FIG. 7A is obtained as shown in FIG. 7D, the timing signal generator 31 which is put in operation to produce the timing signal SXO in a period before a time point te in FIGS. 7A to 7J is operative to stop producing the timing signal SXO after the time point te in response to the asynchronous shutter waiting mode setting signal SWS and to begin to forward continuously the charge-reading timing signal TG and the charge-sweeping timing signal TS in response to the front edge of the internal frame synchronous signal SFO appearing first after the time point te. Thereby, a normal light receiving condition is changed into a condition for waiting shutter operation at the time point te, as indicated in FIG. 7B.

With the charge-reading timing signal TG and the charge-sweeping timing signal TS forwarded from the timing signal generator 31, each of the reading gate driving signal SG and the charge-sweeping driving signal SS is continuously supplied from the driving signal generator 30 to the light receiving and charge transfer portion of the solid-state image pickup device 11 after the time point corresponding to the front edge of the internal frame synchronous signal SFO appearing first after the time point te. Thereby, in the light receiving and charge transfer portion of the solid-state image pickup device 11, each of the charge-reading gate areas 18 is continuously made open in response to the reading gate driving signal SG so that the charge stored in the light receiving areas 16 is read through the charge-reading gate areas 18 to the vertical charge transfer areas 17 and the charge read to the vertical charge transfer areas 17 is transferred, in response to the charge-sweeping driving signal SS, through the vertical charge transfer areas 17 toward the charge absorbing area 26 which is provided on the semiconductor substrate 15 to be opposite to the horizontal charge transfer area 23, so that a charge sweeping operation for sweeping continuously the charge away from the vertical charge transfer areas 17 is continuously performed. The charge swept away from the vertical charge transfer areas 17 by the charge sweeping operation is absorbed by the charge absorbing area 26. In a charge sweeping period in which the charge sweeping operation is continuously carried out, no charge is stored in the light receiving areas 16 constituting the light receiving and charge transfer portion of the solid-state image pickup device 11, as shown in FIG. 7J.

Figure 7C:
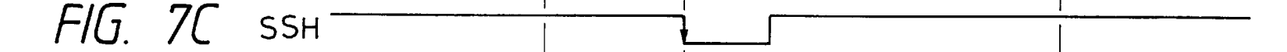
Figure 7D:
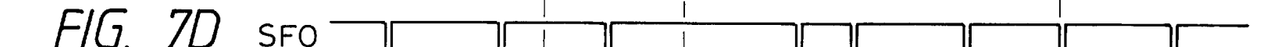
Figures 7E, 7F:
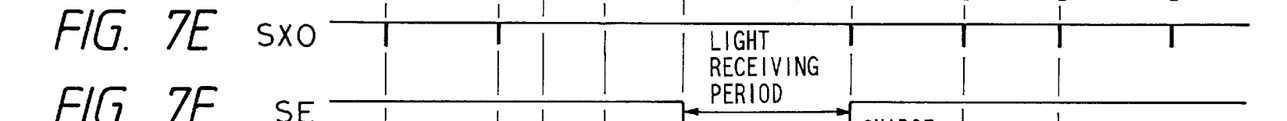

Under the condition in which the charge sweeping operation is continuously carried out in the light receiving and charge transfer portion of the solid-state image pickup device 11, when the shutter operation is set at a time point tf shown in FIGS. 7A to 7J, the shutter signal SSH shown in FIG. 7C is supplied through the terminal 36 to the control unit 33. The control unit 33 supplies the timing signal generator 31 with the light receiving period signal SE shown in FIG. 7F in response to the front edge of the shutter signal SSH. The timing signal generator 31 is operative to reset the production of the internal frame synchronous signal SFO with the front edge of the light receiving period signal SE so that the internal frame synchronous signal SFO is put in asynchronism with the frame synchronous signal SF and the timing signal SXO is stopped to be produced, as shown in FIGS. 7D and 7E, and to terminate to forward continuously the charge-reading timing signal TG and the charge-sweeping timing signal TS.

Figure 7G:
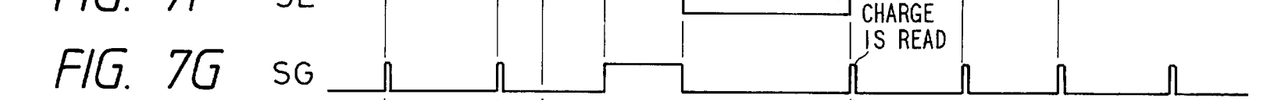
Figure 7H:
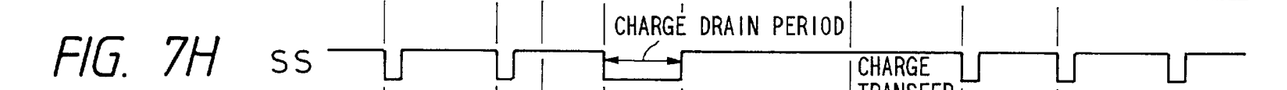
Figures 7I, 7J:
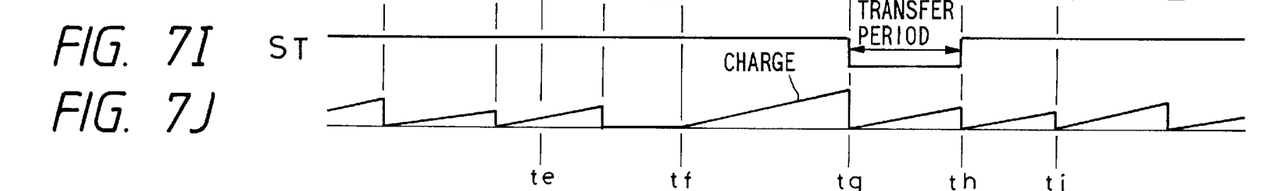

The driving signal generator 30 is operative to stop forwarding continuously the reading gate driving signal SG and the charge-sweeping driving signal SS with the front edge of the light receiving period signal SE, as shown in FIGS. 7G and 7H. Then, the light receiving period for the light receiving and charge transfer portion of the solid-state image pickup device 11 which does not include any charge sweeping period begins at the time point tf corresponding to the front edge of the light receiving period signal SE, as shown in FIG. 7F, and the shutter waiting condition is changed into the normal light receiving condition, as shown in FIG. 7B.

In the light receiving period, the internal frame synchronous signal SFO which is reset at the time point tf corresponding to the front edge of the light receiving period signal SE to be asynchronous with the frame synchronous signal SF is obtained but the timing signal SXO is not obtained after the time point tf. Therefore, the reading gate driving signal SG is not obtained and accordingly each of the charge-reading gate areas 18 is kept closed, so that the charge stored in the light receiving areas 16 increases gradually, as shown in FIG. 7J.

After that, when the rear edge of the light receiving period signal SE supplied to the timing signal generator 31 from the control unit 33 appears at a time point tg, as shown in FIG. 7F, the internal frame synchronous signal SFO is obtained in response to the rear edge of the light receiving period signal SE and the timing signal SXO is obtained in response to the front edge of the internal frame synchronous signal SFO, as shown in FIGS., 7D and 7E, in the timing signal generator 31. The time point tf corresponding to the rear edge of the light receiving period signal SE is determined by the control unit 33 in response to the shutter speed designated by the shutter speed designating signal SSV. The timing signal generator 31 is operative to forward the charge-reading timing signal TG and the charge-transfer timing signal TT in response to the timing signal SXO and therefore the reading gate driving signal SG and the charge-transfer driving signal ST each having the front edge at the time point tb corresponding to the rear edge of the light receiving period signal SE, as shown in FIG. 7G and 7I, are supplied to the light receiving and charge transfer portion of the solid-state image pickup device 11 from the driving signal generator 30 and the light receiving period terminates.

Thereby, in the light receiving and charge transfer portion of the solid-state image pickup device 11, each of the charge-reading gate areas 18 is made open in response to the reading gate driving signal SG so that the charge stored in the light receiving areas 16 is read through the charge-reading gate areas 18 to the vertical charge transfer areas 17, as shown in FIG. 7J, and the charge read to the vertical charge transfer areas 17 is transferred, in response to the charge-transfer driving signal ST, through the vertical charge transfer areas 17 toward the horizontal charge transfer area 23 provided on the semiconductor substrate 15 as the signal charge. The signal charge transferred to the horizontal charge transfer area 23 is further transferred, in response to the charge-transfer driving signal ST, through the horizontal charge transfer area 23 toward the output portion 24. The signal charge transferred to the output portion 24 is converted into the image pickup signal output IP in the output portion 24 and the image pickup signal output IP is derived to the output terminal 25.

The charge transfer period in which the charge transfer operation of the vertical charge transfer areas 17 and the charge transfer operation of the horizontal charge transfer area 23 are carried out terminates with the rear edge of the charge-transfer driving signal ST appearing at a time point th at which the internal frame synchronous signal SFO is obtained and the timing signal SXO is further obtained in response to the front edge of the internal frame synchronous signal SFO in the timing signal generator 31, as shown in FIGS. 7D and 7E. Then, the timing signal generator 31 is operative to forward the charge-reading timing signal TG and the charge-sweeping timing signal TS in response to the timing signal SXO and the reading gate driving signal SG and the charge-sweeping driving signal SS each having the front edge at the time point corresponding to the rear edge of the charge-transfer driving signal ST, as shown in FIGS. 7F and 7G, are supplied from the driving signal generator 30 to the light receiving and charge transfer portion of the solid-state image pickup device 11. Thereby, in the light receiving and charge transfer portion of the solid-state image pickup device 11, the charge sweeping operation is carried out.

After that, at a time point ti, the synchronizing mode reviving signal SR is supplied from the timing signal generator 31 to the control unit 33 and thereby the internal frame synchronous signal SFO produced in the timing signal generator 31 resumes to have the fixed phase difference from the frame synchronous signal SF, as shown in FIG. 7D, and the SF synchronizing mode is revived.

In the case where the image pickup operation for still pictures is carried out under the asynchronous shutter waiting mode as described above, under the condition for waiting shutter operation in which the charge sweeping operation is continuously carried out, when the shutter operation is set, the charge sweeping operation is immediately terminated and the light receiving period for the light receiving and charge transfer portion of the solid-state image pickup device 11 begins immediately after the time point at which the shutter operation is set and thereby a light receiving state in which charge is effectively stored in the light receiving areas 16 constituting the light receiving and charge transfer portion of the solid-state image pickup device 11 is obtained. Accordingly, a quick light-receiving response operation is performed in response to the setting of the shutter operation in the light receiving and charge transfer portion of the solid-state image pickup device 11.

Figure 8A:
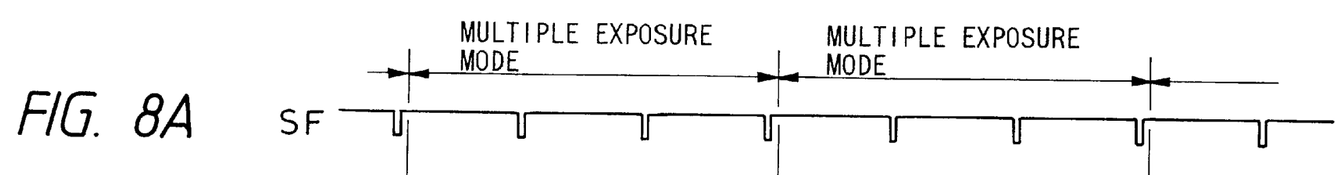
FIGS. 8A to 8G are time charts used for explaining the operation of the embodiment shown in FIG. 2.
Figure 8B:
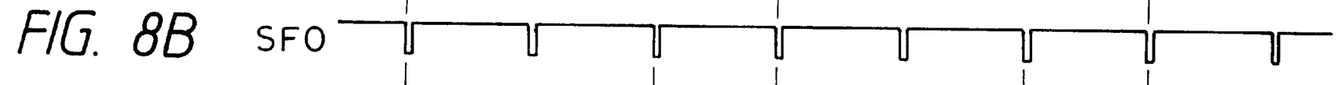
Figures 8C, 8D:
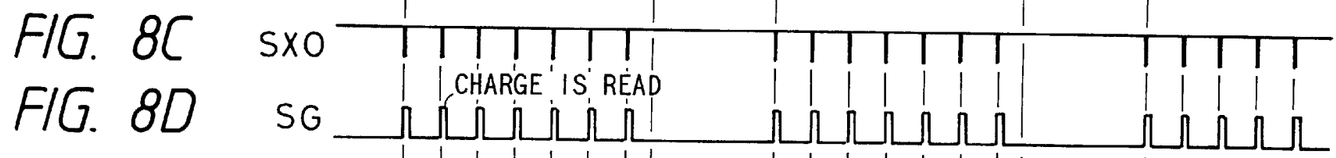

Further, when the operation mode designating signal SM designates the multiple exposure mode, the control unit 33 supplies the timing signal generator 31 with the multiple exposure mode setting signal SMM. The timing signal generator 31 is operative to produce, in response to the multiple exposure mode setting signal SMM, the internal frame synchronous signal SFO shown in FIG. 8B in the similar manner to the frame synchronous signal SF obtained from the synchronous signal generator 32 as shown in FIG. 8A, and to produce also a predetermined number of, for example, seven timing signals SXO in each unit period composed of successive three periodic intervals of the internal frame synchronous signal SFO, as shown in FIG. 8C. In each unit period, the first one of the timing signals SXO appears at the beginning of that unit period.

The timing signal generator 31 is further operative, in each unit period, to forward the charge-reading timing signal TG at the time point corresponding to the front edge of each of the timing signals SXO, to forward continuously the charge-drain timing signal TD during a period from the rear edge of the last one of the timing signals SXO to the end of the unit period, and to forward continuously the charge-transfer timing signal TT during the last one of the successive three periodic intervals of the internal frame synchronous signal SFO.

Figure 8E:
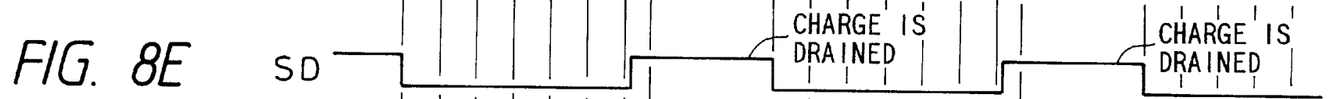
Figure 8F:
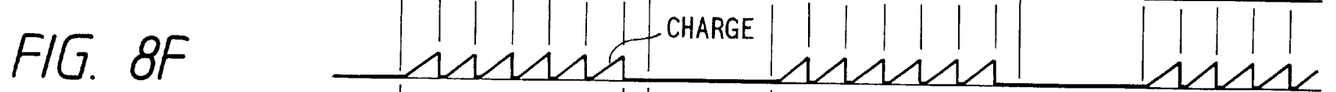
Figure 8G:
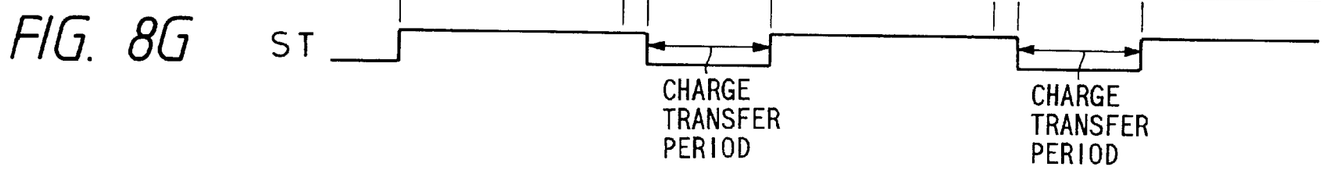

The driving signal generator 30, to which the charge-reading timing signal TG, the charge-drain timing signal TD and the charge-transfer timing signal TT each forwarded from the timing signal generator 31 are supplied, is operative to supply, in response to the charge-reading timing signal TG, the light receiving and charge transfer portion of the solid-state image pickup device 11 with a predetermined number of, for example, seven reading gate driving signals SG shown in FIG. 8D in each unit period corresponding to successive three periodic intervals of the internal frame synchronous signal SFO, and to supply, in response to the charge-drain timing signal TD, the light receiving and charge transfer portion of the solid-state image pickup device 11 with an overflow gate control signal SD continuing over the period from the rear edge of the last one of the timing signals SXO to the end in each unit period, as shown in FIG. 8E. The driving signal generator 30 is further operative to supply, in response to the charge-transfer timing signal TT, the light receiving and charge transfer portion of the solid-state image pickup device 11 with the charge-transfer driving signal ST continuing over the last one of the successive three periodic intervals of the internal frame synchronous signal SFO in each unit period, as shown in FIG. 8G.

With the reading gate driving signals SG, the overflow gate control signal SD and the charge-transfer driving signal ST supplied from the driving signal generator 30 as described above, separated light receiving periods for the light receiving and charge transfer portion of the solid-state image pickup device 11 are provided between each adjacent two of the reading gate driving signals SG in each unit period corresponding to successive three periodic intervals of the internal frame synchronous signal SFO. Therefore, in the light receiving and charge transfer portion of the solid-state image pickup device 11, charge produced by light reception is stored in the light receiving areas 16 during each of the separated light receiving periods provided in each unit period as shown in FIG. 8F, and the charge stored in the light receiving areas 16 during each of the separated light receiving periods is read through the charge-reading gate areas 18 to the vertical charge transfer areas 17 during the period succeeding to the separated light receiving period with the reading gate driving signal SG supplied to the light receiving and charge transfer portion.

Then, the charge read intermittently from the light receiving areas 16 through the charge-reading gate areas 18 to the vertical charge transfer areas 17 in each unit period corresponding to successive three periodic intervals of the internal frame synchronous signal SFO, is accumulated in the vertical charge transfer areas 17 until the last one of the successive three periodic intervals of the internal frame synchronous signal SFO in that unit period. Consequently, in substance, the light receiving areas 16 constituting the light receiving and charge transfer portion of the solid-state image pickup device 11 are subjected to multiple exposure in each unit period corresponding to successive three periodic intervals of the internal frame synchronous signal SFO.

In the last one of the successive three periodic intervals of the internal frame synchronous signal SFO in each unit period, the charge accumulated in the vertical charge transfer areas 17 is transferred through the vertical charge transfer areas 17 to the horizontal charge transfer area 23 and further transferred through the horizontal charge transfer area 23 to the output portion 24 as a signal charge with the charge-transfer driving signal ST supplied to the light receiving and charge transfer portion of the solid-state image pickup device 11. The signal charge transferred to the output portion 24 is converted into the image pickup signal output IP in the output portion 24 and the image pickup signal output IP is derived to the output terminal 25.

In the period in which the charge accumulated in the vertical charge transfer areas 17 is transferred as the signal charge, charge which is produced by light reception in the light receiving areas 16 is drained to the drain area 21 through the overflow control area 20 which is made open with the overflow gate control signal SD supplied to the overflow gate electrode ED. Accordingly, unnecessary charge is not stored in the light receiving areas 16 constituting the light receiving and charge transfer portion of the solid-state image pickup device 11 at the first one of the separated light receiving periods in each unit period corresponding to successive three periodic intervals of the internal frame synchronous signal SFO.

In the case where the image pickup operation for still pictures is carried out under the multiple exposure mode as described above, in substance, the image pickup signal output IP produced based on the signal charge read from the light receiving areas 16 constituting the light receiving and charge transfer portion of the solid-state image pickup device 11, which is subjected to the multiple exposure in each unit period corresponding to successive three periodic intervals of the internal frame synchronous signal SFO, is obtained with relatively simple structure and easy control operations.

What is claimed is:

1. An image pickup apparatus comprising;

a solid-state image pickup device having a light receiving and charge transfer portion which comprises a plurality of light receiving areas for storing charge produced by light reception, charge transfer areas for transferring charge, charge-reading gate areas for reading the charge stored in the light receiving areas to the charge transfer areas, and an output portion for converting the charge transferred through the charge transfer areas into an image pickup signal output, synchronous signal generating means for producing line and frame synchronous signals, timing signal generating means for producing selectively a first internal frame synchronous signal having the same phase as the frame synchronous signal or a fixed phase difference from the frame synchronous signal, an internal line synchronous signal having the same phase as the line synchronous signal or a fixed phase difference from the line synchronous signal, and a second internal frame synchronous signal asynchronous with the frame synchronous signal and for forwarding a charge-reading timing signal and a charge-transfer timing signal each synchronizing with one of the first and second internal frame synchronous signals and the internal line synchronous signal, driving signal generating means for producing a gate driving signal and a charge-transfer driving signal in response to the charge-reading timing signal and the charge-transfer timing signal, respectively, and for supplying the charge-reading gate areas and the charge transfer areas with the gate driving signal and the charge-transfer driving signal, respectively, and control means operative to form a light receiving period signal in response to an edge of the internal line synchronous signal which occurs first after an edge of a light-receiving command signal supplied thereto and, in response to the light receiving period signal, to cause the timing signal generating means to produce the second internal frame synchronous signal and forward the charge-reading timing signal and the charge-transfer timing signal such that a light receiving period for the light receiving and charge transfer portion of the solid-state image pickup device begins after the edge of the internal line synchronous signal which occurs within a time period corresponding to one line period after the edge of the light-receiving command signal.

2. An image pickup apparatus according to claim 1, wherein said timing signal generating means is operative to forward a charge-sweeping timing signal synchronizing with one of the first and second internal frame synchronous signals in addition to the charge-reading timing signal and the charge-transfer timing signal, and said driving signal generating means is operative to supply the charge transfer areas with a charge-sweeping driving signal produced in response to the charge-sweeping timing signal so that charge in the charge transfer areas is swept away in the solid-state image pickup device and then to supply the charge transfer areas with the charge-transfer driving signal so that charge stored in the charge transfer areas is transferred to the output portion as signal charge in the solid-state image pickup device.

3. An image pickup apparatus according to claim 2, wherein said control means is operative first to cause the timing signal generating means to forward the charge-reading timing signal and the charge-sweeping timing signal so that charge in the light receiving areas and the charge transfer areas is swept away in the solid-state image pickup device, and then to cause the timing signal generating means to forward the charge-reading timing signal and the charge-transfer timing signal so that the charge stored in the light receiving areas is transferred through the charge transfer areas to the output portion as the signal charge in the solid-state image pickup device after the light receiving period for the light receiving and charge transfer portion of the solid-state image pickup device has passed.

4. An image pickup apparatus according to claim 2, wherein said control means is operative to put the timing signal generating means in a light-receiving command waiting condition for forwarding continuously the charge-reading timing signal and the charge-sweeping timing signal after a period in synchronism with the second internal frame synchronous signal so that the charge in the light receiving areas and the charge transfer areas is continuously swept away in the solid-state image pickup device, to cause the timing signal generating means to stop forwarding the charge-reading timing signal and the charge-sweeping timing signal so that the light receiving period for the light receiving and charge transfer portion of the solid-state image pickup device begins when the light receiving command signal is supplied to the control means under the light-receiving command waiting condition, and then to cause the timing signal generating means to forward the charge-reading timing signal and the charge-transfer timing signal each synchronizing with the second internal frame synchronous signal so that the charge stored in the light receiving areas is transferred through the charge transfer areas to the output portion as the signal charge in the solid-state image pickup device after the light receiving period has passed.

5. An image pickup apparatus according to claim 2, wherein said control means is operative to cause the timing signal generating means to forward the charge-reading timing signal repeatedly by a number of predetermined times so that the charge stored in the light receiving areas is read to the charge transfer areas intermittently by the number of predetermined times and accumulated in the charge transfer areas in the solid-state image pickup device in a predetermined unit period determined based on the second internal frame synchronous signal, and then to cause the timing signal generating means to forward the charge-transfer timing signal so that the charge accumulated in the charge transfer areas is transferred through the charge transfer areas to the output portion as the signal charge in the solid-state image pickup device.

6. An image pickup apparatus according to claim 5, wherein said control means is operative to cause the timing signal generating means to forward a charge-drain timing signal so that the driving signal generating means supplies overflow control areas in the solid-state image pickup device with an overflow gate control signal produced in response to the charge-drain timing signal and thereby charge in the light receiving and charge transfer areas is drained through the overflow control areas to drain areas in the solid-state image pickup device before the timing signal generating means forwards the charge-transfer driving signal so that the charge accumulated in the charge transfer areas is transferred to the output portion as the signal charge in the solid-state image pickup device.

7. An image pickup apparatus comprising:
a solid-state image pickup device having a light receiving and charge transfer portion which comprises a plurality of light receiving areas for storing charge produced by light reception, charge transfer areas for transferring charge, charge-reading gate areas for reading the charge stored in the light receiving areas to the charge transfer areas, and an output portion for converting the charge transferred through the charge transfer areas into an image pickup signal output;

synchronous signal generating means for producing frame synchronous signals;

timing signal generating means for producing selectively an internal frame synchronous signal having the same phase as the frame synchronous signal or a fixed phase difference from the frame synchronous signal, and for forwarding a charge-reading timing signal and a charge-transfer timing signal each synchronizing with said internal frame synchronous signals;

driving signal generating means for producing a gate driving signal and a charge-transfer driving signal in response to the charge-reading timing signal and the charge-transfer timing signal, respectively, and for supplying the charge-reading gate areas and the charge transfer areas with the gate driving signal and the charge-transfer driving signal, respectively; and control means operative to cause the timing signal generating means to forward the charge-reading timing signal repeatedly by a number of predetermined times so that the charge stored in the light receiving areas is read to the charge transfer areas intermittently by the number of predetermined times and accumulated in the charge transfer areas in the solid-state image pickup device in a predetermined unit period determined based on the internal frame synchronous signal, and then to cause the timing signal generating means to forward the charge-transfer timing signal so that the charge accumulated in the charge transfer areas is transferred through the charge transfer areas to the output portion as the signal charge in the solid-state image pickup device.

8. An image pickup apparatus with a solid-state image pickup device comprising:
a solid-state image pickup device having a light receiving and charge transfer portion which comprises a plurality of light receiving areas for storing charge produced by light reception, charge transfer areas for transferring charge, charge-reading gate areas for reading the charge stored in the light receiving areas to the charge transfer areas, and an output portion for converting the charge transferred through the charge transfer areas into an image pickup signal output;

synchronous signal generating means for producing line and frame synchronous signals;

timing signal generating means for producing selectively a first internal frame synchronous signal having the same phase as the frame synchronous signal or a fixed phase difference from the frame synchronous signal and a second internal frame synchronous signal asynchronous with the frame synchronous signal and for forwarding a charge-reading timing signal and a charge-transfer timing signal each synchronizing with one of the first and second internal frame synchronous signals;

driving signal generating means for producing a gate driving signal and a charge-transfer driving signal in response to the charge-reading timing signal and the charge-transfer timing signal, respectively, and for supplying the charge-reading gate areas and the charge transfer areas with the gate driving signal and the charge-transfer driving signal, respectively; and control means operative, in response to a light-receiving command signal supplied thereto, to cause the timing signal generating means to produce the second internal frame synchronous signal and forward the charge-reading timing signal and the charge-transfer timing signal each synchronizing with the second internal frame synchronous signal during a predetermined period so that a light receiving period for the light receiving and charge transfer portion of the solid-state image pickup device is determined in response to the second internal frame synchronous signal;

wherein said timing signal generating means is operative to forward a charge-sweeping timing signal synchronizing with one of the first and second internal frame synchronous signals in addition to the charge-reading timing signal and the charge-transfer timing signal, and said driving signal generating means is operative to supply the charge transfer areas with a charge-sweeping driving signal produced in response to the charge-sweeping timing signal so that charge in the charge transfer areas is swept away in the solid-state image pickup device and then to supply the charge transfer areas with the charge-transfer driving signal so that charge stored in the charge transfer areas is transferred to the output portion as signal charge in the solid-state image pickup device, wherein said control means is operative to cause the timing signal generating means to forward the charge-reading timing signal repeatedly by the number of predetermined times so that the charge stored in the light receiving areas is read to the charge transfer areas intermittently by the number of predetermined times and accumulated in the charge transfer areas in the solid-state image pickup device in a predetermined unit period determined based on the second internal frame synchronous signal, and then to cause the timing signal generating means to forward the charge-transfer timing signal so that the charge accumulated in the charge transfer areas is transferred through the charge transfer areas to the output portion as the signal charge in the solid-state image pickup device, and wherein said control means is operative to cause the timing signal generating means to forward a charge-drain timing signal so that the driving signal generating means supplies overflow control areas in the solid-state image pickup device with an overflow gate control signal produced in response to the charge-drain timing signal and thereby charge in the light receiving and charge transfer areas is drained through the overflow control areas to drain areas in the solid-state image pickup device before the timing signal generating means forwards the charge-transfer driving signal so that the charge accumulated in the charge transfer areas is transferred to the output portion as the signal charge in the solid-state image pickup device.

* * * * *